US00RE45373E

(19) United States
(12) Reissued Patent
Allen, Jr. et al.

(10) Patent Number: US RE45,373 E
(45) Date of Reissued Patent: Feb. 17, 2015

(54) ON DEMAND ELECTRONIC FAUCET

(71) Applicant: Sloan Valve Company, Franklin Park, IL (US)

(72) Inventors: Charles S. Allen, Jr., Northfield, IL (US); Peter Zosimadis, Toronto (CA)

(73) Assignee: Sloan Valve Company, Franklin Park, IL (US)

(21) Appl. No.: 13/946,765

(22) Filed: Jul. 19, 2013

Related U.S. Patent Documents

Reissue of:
(64) Patent No.: 7,979,928
Issued: Jul. 19, 2011
Appl. No.: 11/863,191
Filed: Sep. 27, 2007

U.S. Applications:
(60) Provisional application No. 60/848,430, filed on Sep. 29, 2006.

(51) Int. Cl.
*E03C 1/05* (2006.01)

(52) U.S. Cl.
USPC ..... 4/623

(58) Field of Classification Search
USPC ..... 4/623, 304, 305, 313, 668, DIG. 3; 251/129.04
See application file for complete search history.

(56) References Cited

U.S. PATENT DOCUMENTS

| | | | |
|---|---|---|---|
| 3,333,160 | A | 7/1967 | Gorski |
| 4,306,314 | A | 12/1981 | Griffiths |
| 4,606,085 | A | 8/1986 | Davies |
| 4,823,414 | A | 4/1989 | Piersimoni et al. |
| 4,839,039 | A | 6/1989 | Parsons et al. |
| 4,908,886 | A | 3/1990 | Barrett, Sr. et al. |
| 4,914,758 | A | 4/1990 | Shaw |
| 4,921,211 | A | 5/1990 | Novak et al. |
| 4,955,535 | A | 9/1990 | Tsutsui et al. |
| 5,031,258 | A | 7/1991 | Shaw |
| 5,060,323 | A | 10/1991 | Shaw |
| 5,063,622 | A | 11/1991 | Tsutsui et al. |
| 5,086,526 | A | 2/1992 | Van Marcke |

(Continued)

FOREIGN PATENT DOCUMENTS

| | | |
|---|---|---|
| CN | 1 804 503 | 7/2006 |
| CN | 1 804 503 A | 7/2006 |

(Continued)

OTHER PUBLICATIONS

Chinese Application No. 200780041984.6 Office Communication dated Sep. 14, 2010, 8 pages.

(Continued)

*Primary Examiner* — Gregory Huson
*Assistant Examiner* — Erin Deery
(74) *Attorney, Agent, or Firm* — Foley & Lardner LLP

(57) ABSTRACT

An on-demand electronic faucet system for providing a faucet with a flow of water in response to a stimulus. A sensor unit is positioned remote from the faucet and in wireless communication with a wireless valve control unit. The wireless valve control unit controls a valve in the water supply line that feeds the faucet. In response to a stimulus, the sensor signals the wireless valve control unit to change the status of the valve in the water supply line from open to closed or closed to open and other states affecting flow and temperature.

13 Claims, 7 Drawing Sheets

(56) References Cited

U.S. PATENT DOCUMENTS

| | | | | | |
|---|---|---|---|---|---|
| 5,135,028 | A | | 8/1992 | Rickenbach et al. | |
| 5,175,892 | A | * | 1/1993 | Shaw | 4/623 |
| 5,184,642 | A | * | 2/1993 | Powell | 4/623 |
| 5,226,629 | A | * | 7/1993 | Millman et al. | 251/129.04 |
| 5,243,717 | A | | 9/1993 | Yasuo | |
| 5,482,250 | A | | 1/1996 | Kodaira | |
| 5,577,660 | A | * | 11/1996 | Hansen | 251/129.04 |
| 5,694,653 | A | | 12/1997 | Harald | |
| 5,769,120 | A | | 6/1998 | Laverty, Jr. et al. | |
| 5,781,942 | A | | 7/1998 | Allen et al. | |
| 5,813,655 | A | | 9/1998 | Pinchott et al. | |
| 5,943,713 | A | | 8/1999 | Paterson et al. | |
| 5,961,095 | A | | 10/1999 | Schrott | |
| 6,029,293 | A | | 2/2000 | Paterson et al. | |
| 6,059,192 | A | * | 5/2000 | Zosimadis | 4/623 |
| 6,065,735 | A | | 5/2000 | Clark | |
| 6,206,340 | B1 | * | 3/2001 | Paese et al. | 251/129.04 |
| 6,219,859 | B1 | * | 4/2001 | Derakhshan | 4/623 |
| 6,250,601 | B1 | | 6/2001 | Kolar et al. | |
| 6,279,179 | B1 | | 8/2001 | Register | |
| 6,317,717 | B1 | | 11/2001 | Lindsey et al. | |
| 6,340,032 | B1 | | 1/2002 | Zosimadis | |
| 6,481,634 | B1 | | 11/2002 | Zosimadis | |
| 6,508,272 | B1 | | 1/2003 | Parsons et al. | |
| 6,701,951 | B1 | | 3/2004 | Drinkwater | |
| 6,805,330 | B2 | | 10/2004 | Bush | |
| 6,913,203 | B2 | | 7/2005 | DeLangis | |
| 7,743,782 | B2 | * | 6/2010 | Jost | 4/623 |
| 2005/0167625 | A1 | | 8/2005 | Deen | |
| 2005/0236594 | A1 | | 10/2005 | Lilly et al. | |
| 2006/0000531 | A1 | | 1/2006 | Ezawa | |
| 2008/0078019 | A1 | | 4/2008 | Allen, Jr. et al. | |

FOREIGN PATENT DOCUMENTS

| | | | |
|---|---|---|---|
| DE | 299 22 956 | U1 | 3/2000 |
| EP | 1 662 056 | | 5/2006 |
| EP | 1 662 056 | A | 5/2006 |
| JP | 10 134680 | A | 5/1998 |
| WO | WO 99/04285 | | 1/1999 |
| WO | WO 99/34065 | | 7/1999 |
| WO | WO 2007/124438 | A2 | 11/2007 |

OTHER PUBLICATIONS

Taiwan Application No. 96135942 Official Letter dated Sep. 15, 2011, 6 pages, with two page partial translation.

Written Opinion of the International Searching Authority and International Search Report for PCT/US2007/079749, Dated Apr. 14, 2008, 5 pages.

* cited by examiner

ON DEMAND ELECTRONIC FAUCET

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED PATENT APPLICATION

This application *is a reissue of U.S. Pat. No. 7,979,928* (*previously U.S. patent application Ser. No. 11/863,191, filed Sep. 27, 2007, which* claims priority from U.S. Provisional Patent Application No. 60/848,430, filed Sep. 29, 2006, herein incorporated by reference in its entirety.

BACKGROUND OF THE INVENTION

The present invention relates generally to the field of faucets. More particularly the present invention relates to the field of automatic on-demand electronic faucets.

Recent trends in bathroom design have begun to stress the importance of using "hands-free" electronic faucets. Hands-free electronic faucets are faucets that do not require the typical physical manipulation of a lever or handle to activate the flow of water. Numerous electronic faucet systems have been developed to accomplish this using various detection systems such as infrared, RF (radio frequency), capacitance, optical, and audio. Hands-free systems thus allow users to operate the faucet without the need to touch the hot/cold on/off knobs.

This hands-free feature for water control provides several desirable features. First, a hands-free system provides improved hygienic properties as a user is not required to physically touch any part of the faucet or basin. This is particularly important in high-traffic locations, such as in the commercial setting. This advantage is also desirable in the residential setting in reducing clean-up and preventing the spread of bacteria.

A second feature of hands-free systems is their ease of use. Often a user would find activation of a traditional faucet knob difficult, i.e. when their hands are slick due to soap or the hands are heavily soiled. Hands-free systems allow a user to simply trigger the sensor to start the flow of water. However, many conventional on-demand systems require a user to place their hands under the faucet to trigger water flow. This arrangement can limit how a user is able to use the device.

A third benefit of on-demand systems is water conservation. All hands-free faucets include an automatic shut-off feature, which may be based on a timer mechanism. Such a feature conserves water and a user also does not need to worry about turning the faucet off. Typically on-demand systems use less water than traditional manual systems, in large part because of user's failure to turn the manual systems off. In some automatic systems, the water only comes on when the user's hands are directly below the water exit point. Thus, the ability to incorporate an automatic off-feature allows for more efficient use of water than is typically experienced with traditional faucets.

Although hands-free systems provide numerous benefits, current systems also fail to provide a user with several desired types of functionality. First, with few exceptions, current electronic systems do not allow a user to control, without manual adjustments, the flow of hot and cold water separately or the temperature of the blended stream which exits the faucet. This can be a particular concern for faucets where cold water for drinking, mild water for hand-washing, and hot water for room cleaning may all be required from the same faucet.

Second, an additional constraint that current systems have is their need for a specific fixed activation zone. Regardless of the type of sensor system used, i.e. infrared, RF, capacitance, RF, etc, the hands-free system will have a certain zone of detection where a "target" needs to enter in order to activate the faucet. Current systems typically include a sensor in a fixed position in the faucet or basin, requiring a user's hands to be placed into the basin detection zone to activate the flow of water. While this may be acceptable for simple hand washing, such a design is ineffective for other applications proximate the sink.

Third, current hands-free systems restrict the aesthetic design of the faucet due to the requirement of a sensor in the faucet as previously discussed. This results in users having less variety of faucets to choose from, which may be of particular concern in residential applications.

Fourth, current systems do not provide for retro-fitting of traditional faucets. Typically, users must undertake the expense of an entire new faucet to enjoy the benefits of hands-free functionality, since the sensor is fixed in the basin of the faucet.

SUMMARY OF THE INVENTION

One embodiment of the invention relates to an on-demand electronic system. The system comprises a sensor unit. The sensor unit includes a housing with a sensor for detecting at least one stimulus and a wireless communication device, the sensor unit being located remote from the faucet. The on-demand electronic system also includes at least one wireless control valve device comprising a second wireless communication device in operative communication with a water feed valve and in wireless communication with the sensor wireless communication device. Upon detection of a plurality of stimuli, a signal is transmitted from the sensor unit to the wireless control valve device, thereby triggering a change in the state of the valve, such as turning the water on or off.

In one exemplary embodiment, a wireless electronic control valve is positioned on both the hot and cold water supply lines and both wireless electronic control valves are in communication with the sensor unit. The sensor unit is capable of detecting and distinguishing between at least two stimuli, where a first signal is sent to the hot water valve in response to a first stimulus and a second signal is sent to the cold water valve in response to a second stimulus.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF PREFERRED EMBODIMENTS

Figure 1A:
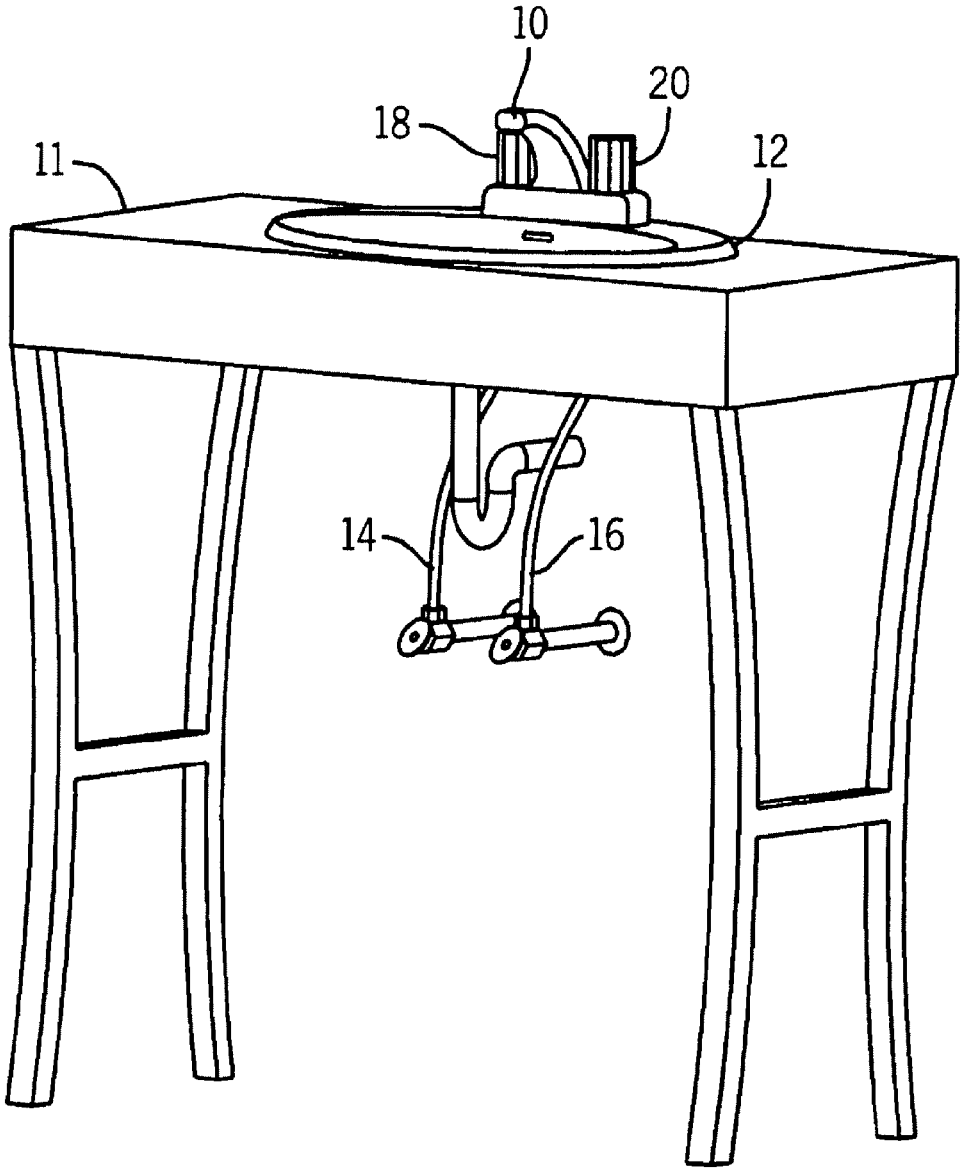
FIG. 1A PRIOR ART
FIG. 1A is a perspective view of a conventional manual faucet with separate hot and cold handles and two single control valves.
Figure 1B:
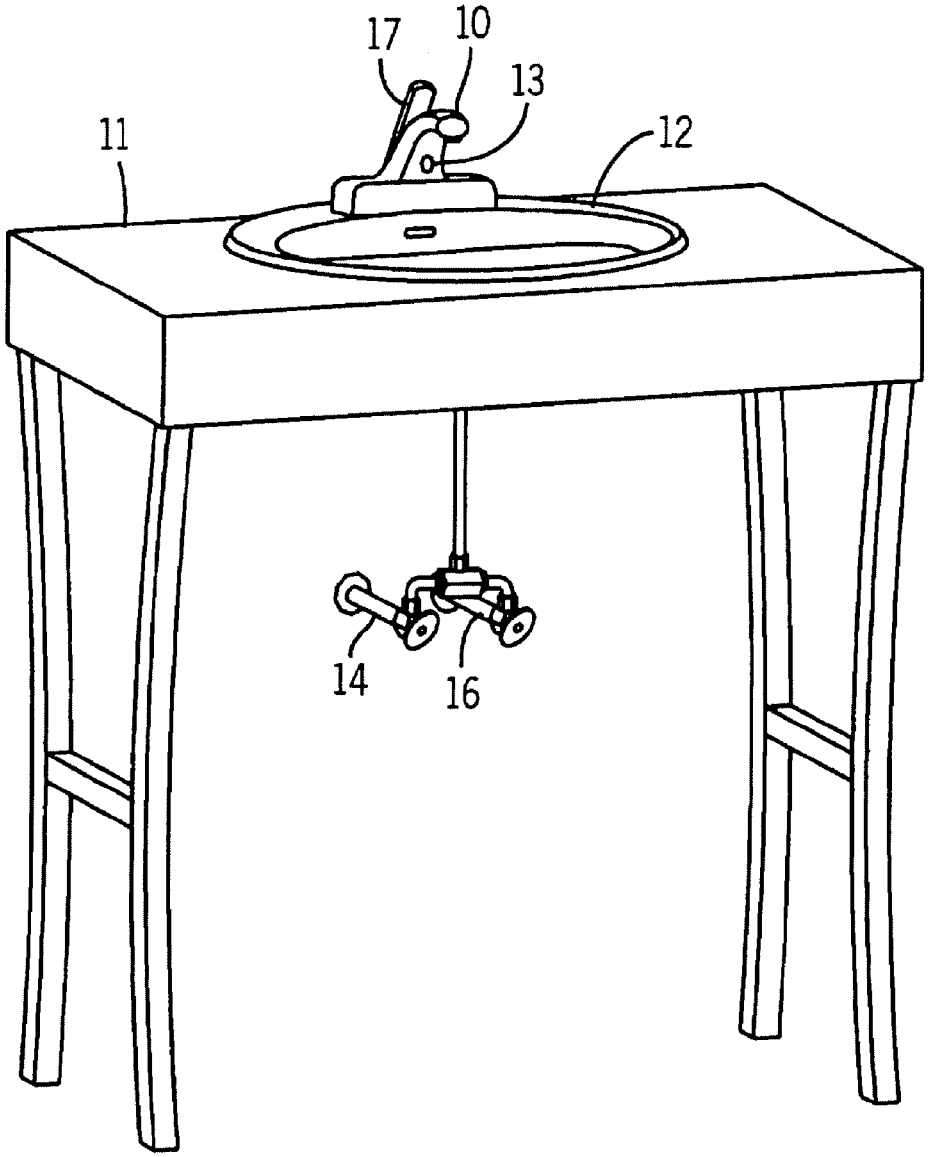
FIG. 1B PRIOR ART
FIG. 1B is a perspective view of conventional manual faucet with a single temperature and flow handle and a dual-control valve.

As shown in FIGS. 1A and 1B, traditional faucet systems include a faucet 10, a vanity 11, a basin 12, a hot water supply line 14, and a cold water supply line 16. Some prior art systems (FIG. 1A) utilize separate hot and cold water supply lines 14, 16 each controlled respectively by a hot water handle 18, and a cold water handle 20 with the aggregate water flow through both supply lines 14, 16 determining the temperature of the water flowing from the faucet 10. Other prior art systems utilize a single handle 17 (see FIG. 1B) that functions to control both the hot and cold water flow. Such prior art faucet systems include a fixed position sensor 13 embedded in the faucet 10, or in the basin 12 itself, such that presence of an object in a portion of the basin 12 may be detected.

Figure 2:
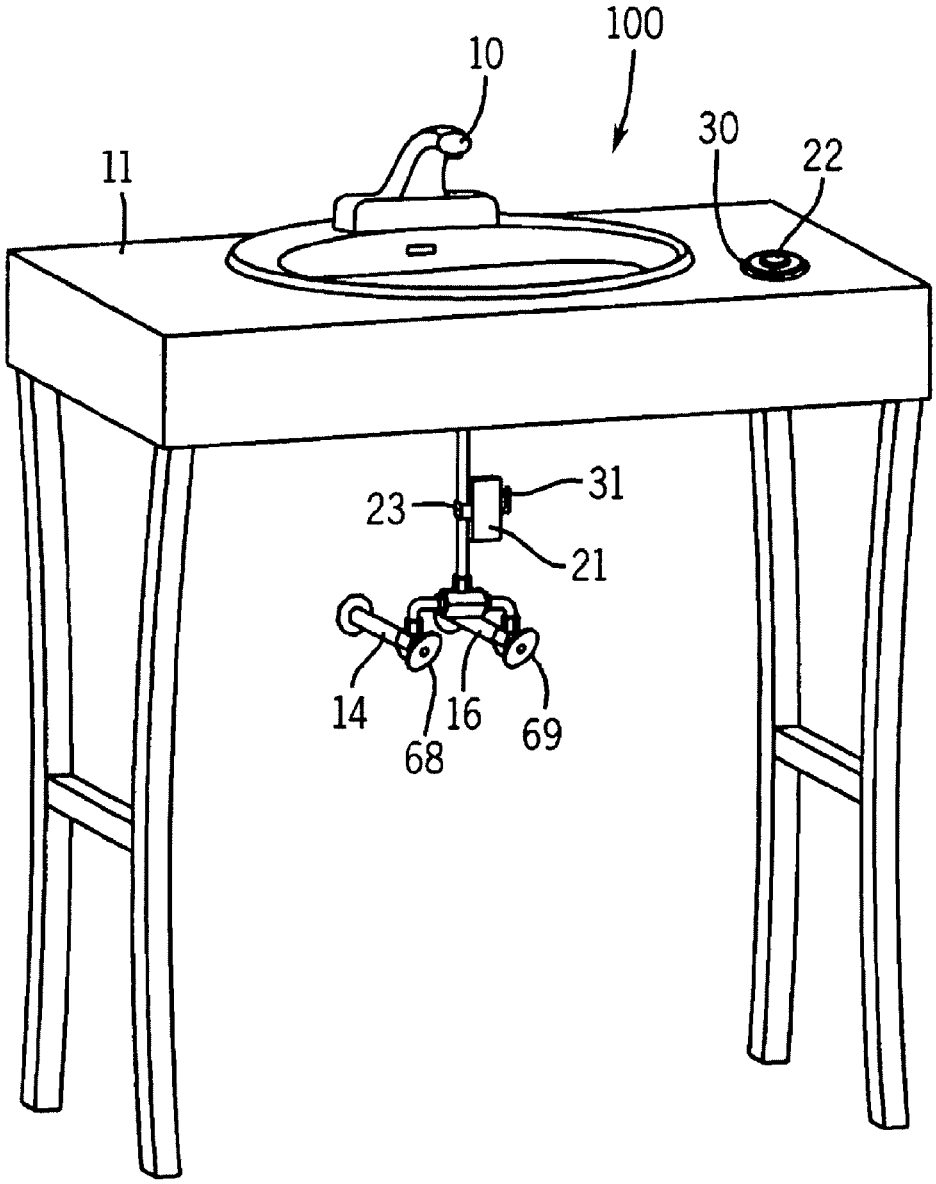
FIG. 2 is a perspective view of an on-demand faucet system with two single-control valves.
Figure 3:
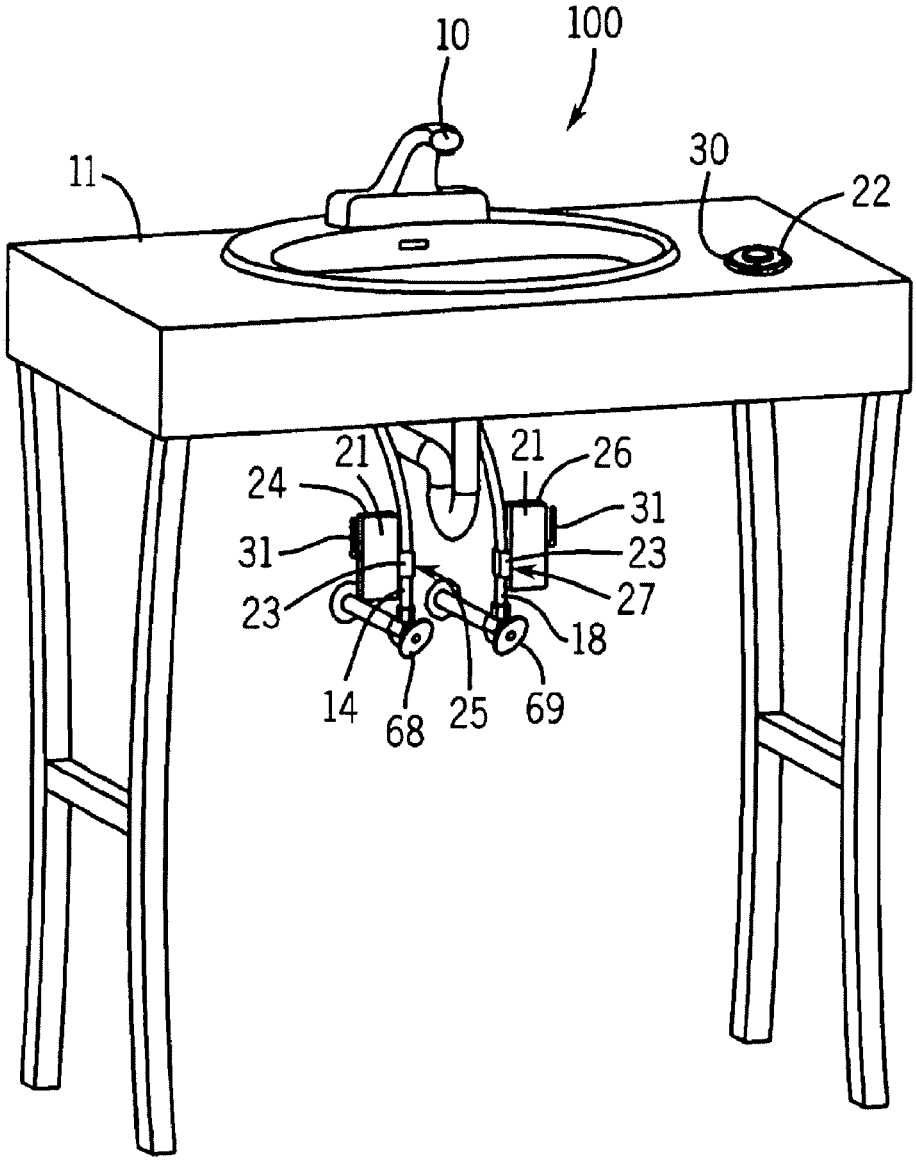
FIG. 3 is a perspective view of an on-demand faucet system with a dual-control valve.

The present invention relates to a hands-free faucet system having on-demand functionality. As shown in FIG. 2 and FIG. 3, the on-demand system 100 includes a sensor unit 22 (shown in greater detail in FIG. 4) in communication with at least one wireless valve control unit 21 for the control of the flow of water from the water lines 14 and 16 to the faucet 10. In one embodiment, the flow of water is regulated by means of at least one valve 23 controlled by the at least one wireless valve control unit 21.

In one exemplary embodiment illustrated in FIG. 3, the at least one wireless valve control unit 21 comprises a wireless hot water valve control unit 24 and a wireless cold water valve control unit 26. The at least one valve 23 comprises a hot water valve 25 and a cold water valve 27. The wireless hot water valve control unit 24 is in communication with the hot water valve 25; and the wireless cold water valve control unit 26 is in communication with the cold water valve 27 such that the units 24 and 26 control the hot water line 14 and the cold water line 16, respectively. Thus, each of the water lines 14 and 16 are effectively in communication with the sensor unit 22 such that their respective flows can be turned on and off as a result of a signal from the sensor unit 22.

In the embodiment illustrated in FIG. 2, the wireless valve control unit 21 is a single unit in communication with a single valve unit 23. The single valve unit 23 may comprise a two-control valve such as, but not limited to, the type described in U.S. Pat. No. 6,508,272, which is incorporated herein by reference. Thus, the flow of both the hot water line 14 and the cold water line 16 may be controlled via a single wireless valve control unit 21.

Figure 4:
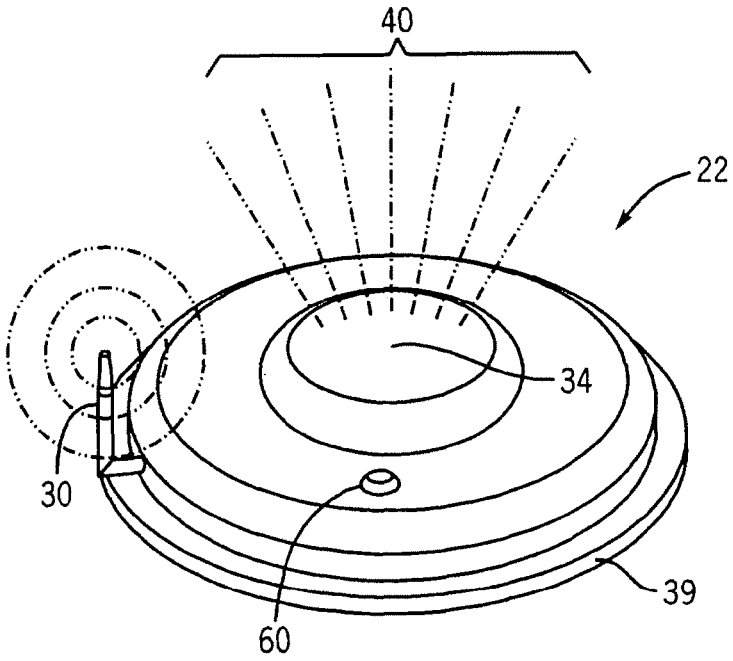
FIG. 4 is an illustration of a sensor unit of the present invention.

The sensor unit 22 is separate from the faucet 10, allowing it to be positioned as needed by a user. FIG. 4, illustrates one exemplary embodiment of the sensor unit 22. In one embodiment the sensor device is removably fixable to a surface, such as but not limited to the vanity 11 shown in FIG. 3. The sensor unit need only be placed so as to be in wireless communication with the hot and cold control valves units 24, 26 respectively.

The sensor unit 22 includes a housing 39, a power source such as a battery (not shown) and a sensor 34 which is capable of detecting a user indicated trigger. In an exemplary embodiment, the electronic components may be part of a printed circuit board (not shown). The sensor 34 has a zone of detection 40, in which it is capable of detecting one or more stimuli (such as presence of a user's hands). In one embodiment, the sensor 34 is a passive infrared (PIR) detector which are well known in the art. Generally, in order to detect a human being, PIR detectors must be sensitive to the temperature difference of a human body compared to the surrounding. Humans, having a skin temperature of about 93 degrees F., radiate infrared energy with a wavelength between 9 and 10 micrometers. In an exemplary embodiment, the sensor unit 22 is sensitive to infrared energy having wavelengths in the range of about 8 to about 12 micrometers. While the present invention has been described in relation to PIR, the use of various conventional detection technologies is within the scope of the present invention. Such conventional detection technologies include but are not limited to: active infra-red, capacitance detection, passive optical detection (e.g., a photo cell), thermal detection such as passive infrared or thermopiles, RF. In one embodiment, because the zone of detection is tied to the location of the sensor unit 22 and the sensor unit 22 may be movable, the zone of detection 40 is not fixed in relation to the faucet 10, but can be adjusted by moving the sensor unit 22.

The sensor unit 22 includes a sensor unit wireless communication device 30 (see FIGS. 4 and 5) for communicating with at least one valve control unit wireless communication device 31 associated with the wireless valve control units 24, 26 (element 30 is depicted as an antennae for graphical clarity. The actual device may not be external and indeed may be within the housing). In an exemplary embodiment, the wireless communication device 30 comprises a radio frequency ("RF") transmitter with the valve control unit wireless communication device 31 including a corresponding RF receiver. The sensor unit 22 transmits an RF signal when the sensor 34 detects a stimulus.

In one embodiment shown in FIG. 4, the sensor unit wireless communication device 30 comprises a sensor unit transceiver, and the valve control unit wireless communication device 31 comprises at least one valve control unit transceiver. The transceivers provide for send/receive communications capabilities. The use of a transceiver allows one to guarantee signal integrity (i.e. when data is sent it can be verified by sensor unit 22 that the wireless control valve unit 21 received the correct data by asking the receiver to send back a verification). In one embodiment, the verification is done via a checksum. If the checksum is correct, the data received by the transmitter was correctly received.

In an exemplary embodiment, the present invention contemplates the use of multiple RF communication devices. In one embodiment, each RF transmission is encoded with a digital ID tag or bit. The receivers within RF range listen to the RF communication, but unless the ID is correct, no action will be taken. In one embodiment, the sensor unit wireless communication device 30 and the valve control unit wireless communication device 31 are a paired unit with the same ID so that when the sensor unit 22 transmits, the appropriate wireless control valve unit 24, 26 will respond. In another embodiment, the sensor unit wireless communication device 30 and the valve control unit wireless communication device 31 use the same frequency transmissions, wherein only matched frequency paired units will respond to one another. That is, the sensor unit 22 and wireless valve control unit 21 are tuned to the same frequency.

In one exemplary embodiment, the sensor unit 22 is adapted to detect various stimuli. In one embodiment the sensor unit 22 detects and differentiates a right to left hand motion of a user from a left to right hand motion within the zone of detection 40. In one embodiment, a first right to left hand motion results in a particular type of signal from the sensor unit 22 which is received by the wireless hot water valve control unit 24. In response to the first right to left hand motion, the hot water valve 25 reverses its state, i.e. it opens if it was closed and closes if it was opened. In an exemplary embodiment, the wireless cold water valve control unit 26 operates in the same manner in response to a left to right hand motion. While the sensor unit 22 has been described as detecting a left to right hand motion versus a right to left hand motion, one of ordinary skill in the art will appreciate that various types of motions and number of preparation for control of water flow rate and temperature are understood to be within the spirit of the invention.

By responding to a signal by reversing state, the present invention allows for a user to both turn the water flow on and off. For example, in one embodiment, a user approaches the faucet 10 (with the flow of water closed) and motions with a hand right to left through the zone of detection 40. This signals the wireless hot water valve control unit 24, which switches the hot water valve 25 (i.e. from off to on assuming the valve was closed), allowing the user to wash their hands. A timer (not shown) is initiated, which will trigger the hot water valve 25 to close after a predetermined amount of time if a user does not initiate another signal. When the user finishes, they provide a hand motion right to left again through the zone of detection 40 resulting in a second signal to the hot water valve 25 stopping the flow of hot water. Thus, a user is provided with a hands-free option away from the faucet 10 to shut the water flow off, a feature absence from current hands-free systems and which allows for even more rigorous control of water usage than reliance on a timer based automatic shutoff alone.

In one exemplary embodiment, the present invention provides for hands free variable control of the water flow volume. In one embodiment, the sensor unit 22, in response to a certain stimulus or stimuli, transmits to the wireless control valve unit 21 a signal to the amount the selected valve is opened providing for variable flows beyond the simple on and off state. In an exemplary embodiment, the hot water valve 25 and the cold water valve 27 are both independently variably controlled by the wireless valve control unit 21 allowing for a myriad of flow combinations resulting in potential temperatures ranging from hot to cold.

In one exemplary embodiment, the faucet 10 includes at least one manual control (i.e. handle). A traditional two handle embodiment is shown in FIG. 1, having the hot water handle 18 and the cold water handle 20 for controlling the hot and cold water respectively. In one embodiment, a user may set the handles 18, 20 for desired flow and/or mixture of hot and cold water. When the on-demand system 100 (see FIG. 2) is activated to allow water flow, the water will flow from the faucet 10 in accordance with the setting of the handles 18, 20. In another exemplary embodiment, the faucet 10 does not include traditional handles for controlling the flow of water. In one embodiment, manual control valves 68, 69 are placed on the hot water line 14 and the cold water line 16 respectively to allow a user to manually set the flow of water and the temperature of water (i.e. the relative ratio of hot to cold water) available to the faucet 10 when the on-demand system 100 is activated.

In one exemplary embodiment, the sensor unit 22 sends a signal to the wireless valve control unit 21, which in turn controls the valves 25, 27 (or 23 in the embodiment of FIG. 2) that is indicative of certain parameters. For example, a user may provide a certain stimulus which corresponds to a change in the flow of water providing the user with the option of a variable flow. Upon detection of a predetermined stimulus, the sensor unit 22 transmits a signal to the wireless valve control unit 21 indicating a change in water flow. The wireless valve control unit 21 then adjusts the valve unit 23 as appropriate. Thus a user can utilize particular stimuli to variably control the water flow.

Figure 6A:
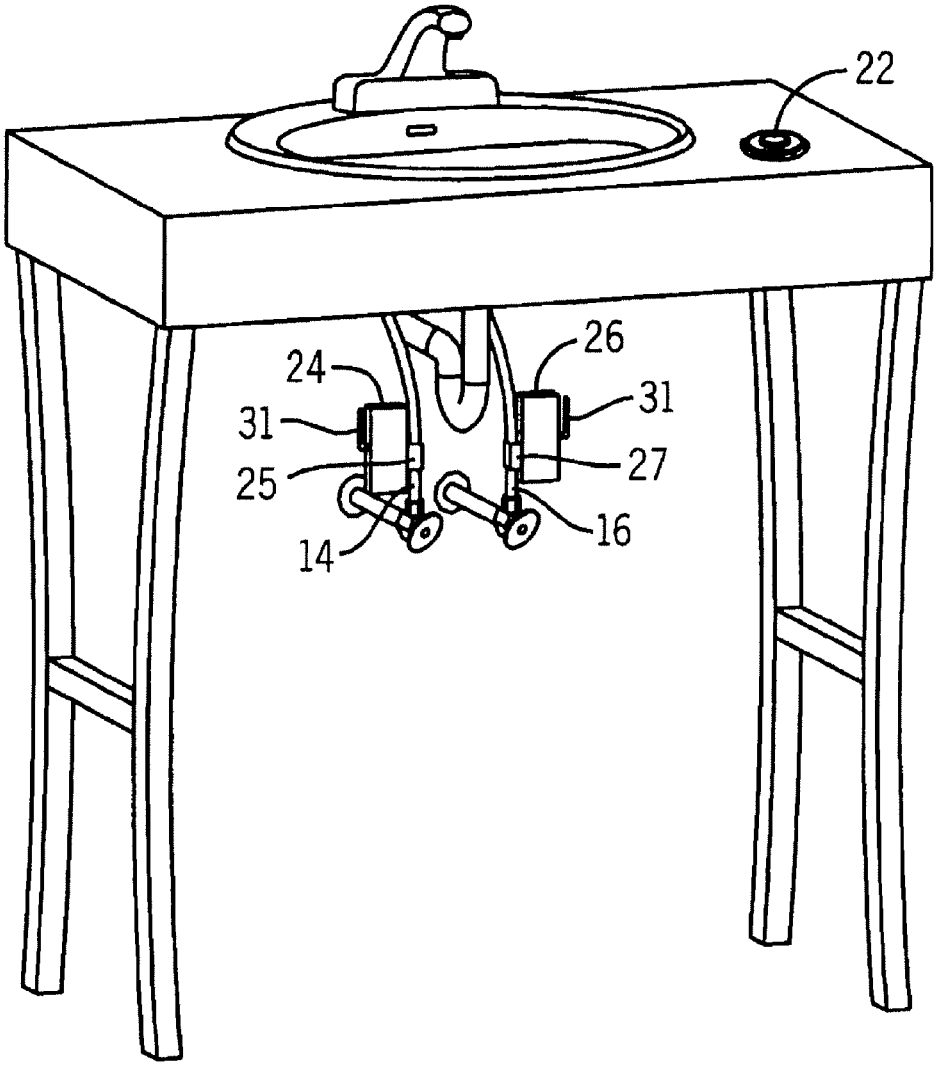
FIG. 6A is an exemplary embodiment of the system of FIG. 2 having a temperature sensor; and 6B is another exemplary embodiment of a sensor unit of the present invention having a display for indicating water temperature.

In one embodiment shown in FIG. 6A, the present invention allows for not only control of flow, but of temperature. In an exemplary embodiment, in response to a first stimulus, the sensor unit 22 sends a first signal to the hot water valve control unit 25 which alters the state of the hot water valve 25 without regard to the state of the cold water valve 27. In response to a second stimulus, the sensor unit 22 sends a second signal to the wireless cold water valve control unit 26 which alters the state of the cold water valve 27 without regard to the state of the hot water valve 25.

Figure 5:
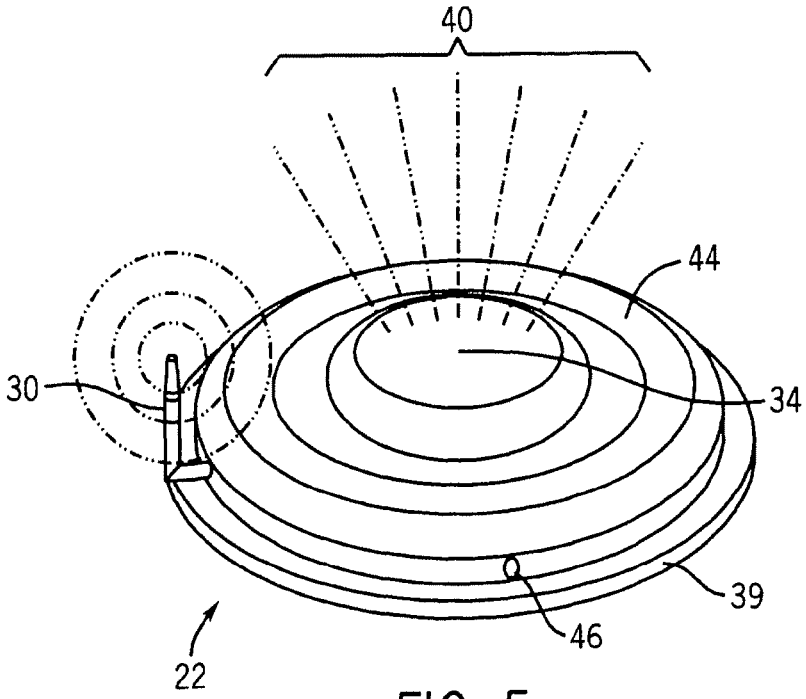
FIG. 5 is another exemplary embodiment of a sensor unit of the present invention having a light source.

In one embodiment, illustrated in FIG. 5, a visible light source 44 can be integrated into the sensor unit 22. In an exemplary embodiment, the light source 44 is in communication with a light sensor 46 whereby the light source 44 is on when low or no light levels are detected. Thus, the sensor unit 22 can also have the functionality of a nightlight or because for identifying its operative location. In an exemplary embodiment, the area lit by the light source 44 substantially corresponds to the zone of detection 40. In another exemplary embodiment, the area lit by the light source 44 roughly corresponds to the location of or actual geometry for the basin 12 for the faucet 10. This night light feature can also provide useful positional and obstacle information at night time, such as the location of a vanity, basin, or faucet while generally illuminating the area.

Figure 6B:
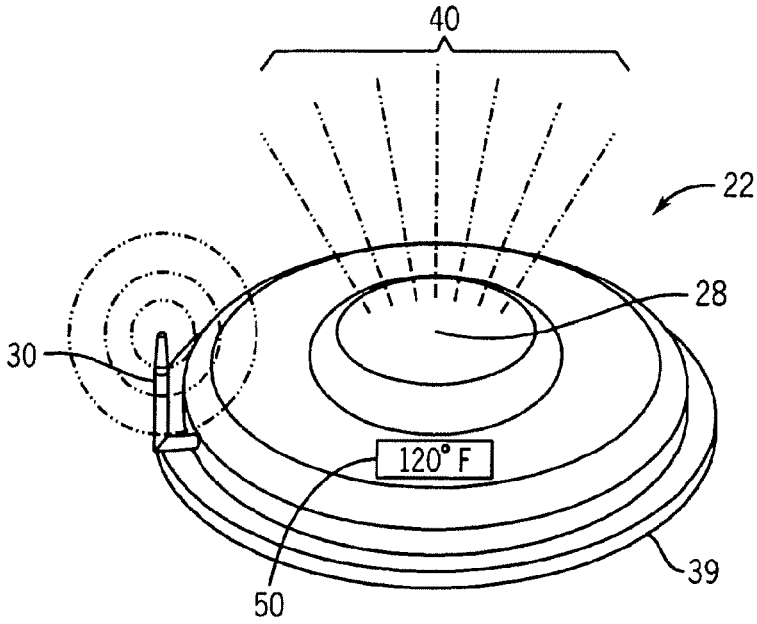

In another embodiment, illustrated in FIGS. 6A and 6B, the wireless control valve unit 21 include a temperature sensor (not shown) typically located on the water supply that measures the mixed water temperature. In an exemplary embodiment, the sensor unit 22 includes a display 50 (FIG. 6B) in communication with the temperature sensor (not shown) for displaying the temperature. In another exemplary embodiment the temperatures sensor 48 is provided downstream from the wireless control valve unit 21 and is in communication with the sensor unit 22. In another exemplary embodiment, an emergency cutoff mechanism is provided whereby the flow of liquid to the faucet 10 is interrupted if the temperature of the liquid exceeds a certain threshold.

Figure 7:
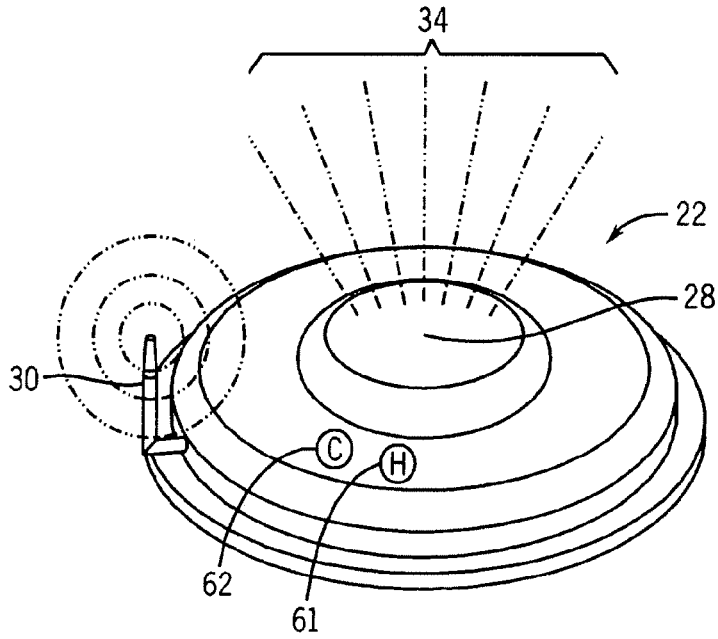
FIG. 7 is another exemplary embodiment of a sensor unit of the present invention having a manual actuation mechanism.

In one embodiment, illustrated in FIG. 4, the sensor unit 22 further includes manual buttons 60 for activation of the valves 25, 27 (FIG. 6A). In an exemplary embodiment, at least one button 60 is provided. Actuation of the button 60 results in a signal from the sensor unit wireless communication device 30 of the sensor unit 22 to the valve control unit wireless communication device 31 of the wireless control valve unit 21 (FIG. 2). In one embodiment (FIG. 7), a single button 60 provided which regulates the flow of water. In another embodiment (FIG. 7), a pair of buttons 61, 62 are provided, with a cold water manual control button 61 corresponding to flow of cold water and a hot water manual control button 61 corresponding to the flow of hot water. In an exemplary embodiment, a user activates the button 62, the flow of cold water begins and when activated again, the flow ceases. Likewise the button 61 controls the flow of hot water. Activation of the both buttons 61 and 62 provides for tepid water. In one embodiment, the buttons 60, 61, 62 provide for variable control of the water such that holding down the button provides for a greater volume of water flow.

In one embodiment, the present invention relates to a sensor in communication with a flow-through valve which controls temperature, but does not control of flow or flow volume. The wireless control valve unit 21 is in operative communication with the flow-through valve to provide for control of the temperature of the water in response to a signal from the sensor unit 22.

In one embodiment, the sensor unit 21 may be powered by batteries. In an alternative embodiment, the sensor unit 21 is receives power via a standard wall outlet, such as through the use of step down voltage adaptor transformer.

In one embodiment, an automatic shut-off timer (not shown) is provided. The automatic shutoff timer is activated when the control valve device is switched from closed to open, triggering a counter. A predetermined time value is compared to the counter value and when the predetermined time is exceeded the state of the control valve is changed from open to closed if control valve does not close prior to the predetermined time.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A wireless apparatus for controlling water flow to a faucet fed by a water line having a hot water supply valve and a cold water supply valve, the wireless apparatus comprising:

[a sensor unit having] a housing [with a sensor for detecting and differentiating a plurality of stimuli,] *having* a manual actuation switch, and a [sensor] wireless communication device, the [sensor unit] *housing* located remote from the faucet;

a wireless hot water control valve device in operative communication with the hot water valve such that the wireless hot water control valve device selectively controls the volume of hot water supplied to the water supply line;

a wireless cold water control valve device in operative communication with the cold water valve such that the wireless cold water control valve device selectively controls the volume of cold water supplied to the water supply line wherein upon detection of a first stimulus [of the plurality of stimuli or actuation of the] *from the* manual actuation switch, a first signal is transmitted from the [sensor] wireless communication device to the wireless cold water control valve device thereby triggering a change in the state of the cold water supply valve and upon detection of a second stimulus [of the plurality of stimuli] *from the manual actuation switch*, a second signal is transmitted from the [sensor] wireless communication device to the wireless hot water control valve device thereby triggering a change in the state of the hot water supply valve, wherein the rate of flow of water from the faucet is altered upon detection of a third stimulus *from the manual actuation switch*, wherein the faucet is positioned on a vanity and the [sensor unit] *housing* is positioned remotely therefrom on another portion of the vanity[, the sensor unit have a zone of detection above the vanity,] and wherein the [sensor unit] wireless communication device transmission [have] *has* an identification code and the wireless cold water control valve device and the wireless hot water control valve device respond only to transmission bearing the identification code.

2. The wireless apparatus of claim 1, wherein the [sensor] wireless communication device comprises a [sensor] transceiver, the wireless cold water control valve device also comprises a wireless cold water control valve transceiver, and the wireless hot water control valve device also comprises a wireless hot water control valve transceiver, the transceivers being in wireless send/receive communication with each other.

3. The wireless apparatus of claim 2 wherein the [sensor] transceiver, upon transmitting data, verifies that the control valve transceiver received the data.

4. The wireless apparatus of claim 1, wherein the [sensor unit] wireless communication device and the wireless cold water control valve device and the wireless hot water control valve device have paired frequencies for wireless communication.

5. The wireless apparatus of claim 1, wherein the [sensor unit] wireless communication device comprises a transmitter the wireless cold water control valve device comprises a receiver, and the wireless hot water control valve device comprises a receiver, the transmitter and receivers in wireless communication.

6. The wireless apparatus of claim 5, wherein the transmitter and receivers communication via radio frequency transmissions.

7. The wireless apparatus of claim 1 further comprising a light positioned in the [sensor unit] *housing*.

8. An on-demand faucet system comprising:

a vanity having a basin and a faucet, the faucet in fluid communication with a water supply line formed from a hot water supply line and a cold water supply line;

a hot water valve operatively positioned on the hot water supply line for controlling the volume of hot water supplied to the water supply line;

a wireless hot water valve receiver in operative communication with the hot water valve such that the wireless hot water valve receiver selectively controls the volume of hot water supplied to the water supply line;

a cold water valve operatively positioned on the cold water supply line for controlling the volume of cold water supplied to the water supply line;

a wireless cold water valve receiver in operative communication with the cold water valve such that the wireless cold water valve receiver selectively controls the volume of cold water supplied to the water supply line; and a sensor unit positioned on the vanity remote from the faucet and comprising a housing with a wireless transmitter, a manual actuation switch, a temperature display configured to indicate the temperature of water at the faucet, and a sensor having a zone of detection above the vanity for presence detection, the transmitter of the sensor unit in wireless communication with the wireless hot water valve receiver and the wireless cold water valve receiver; and wherein upon presence detection, the flow of water supplied from the cold water supply line and the hot water supply line to the water supply line is altered, adjusting the temperature of the water from the faucet, wherein the sensor is able to discern at least a first, second and third type of presence, wherein upon detection of the first type of presence, a first transmission is made to the hot water valve device triggering a change in state of the hot water valve and upon detection of a second type of presence, a second signal is transmitted to the cold water valve device triggering a change in state of the cold water valve, thus allowing for independent control of the hot water supply line and the cold water supply line, wherein the rate of flow of water from the faucet is altered upon detection of a third type of presence, wherein the faucet is positioned on a vanity and the sensor unit is positioned remotely therefrom on another portion of the vanity, and wherein the sensor unit wireless communication device transmission have an identification code and the wireless cold water control valve device and the wireless hot water control valve device respond only to transmission bearing the identification.

9. The on-demand faucet system of claim 8, wherein the zone of detection is such that the sensor is capable of detecting presence and wherein the zone of detection is movable in relation to the faucet.

10. The on-demand faucet system of claim 8, further comprising a temperature sensor positioned in thermal contact with the water supply line and in wireless communication with the sensor unit, the sensor unit comprising a display for indicating the temperature of the water.

11. The on-demand faucet system of claim 10, further comprising a temperature triggered water shut-off switch positioned on the water supply line and in communication with the temperature sensor, wherein the flow of water to the faucet is stopped when the temperature sensor detects a temperature above a predetermined limit.

12. The on-demand faucet system of claim 8, further comprising an automatic shut-off timer, activated when the control valve device is switched from closed to open and which changes the state from open to closed after a predetermined period.

13. The on-demand faucet system of claim 8, further comprising a manual actuator positioned on the sensor unit and in communication with the sensor unit wireless transmitter wherein actuation of the actuator initiates a transmission of a signal to one or both of the hot and cold control valve receivers.

* * * * *